(12) United States Patent
Puech

(10) Patent No.: US 6,847,205 B2
(45) Date of Patent: Jan. 25, 2005

(54) CONTACTLESS HALL-EFFECT ANGULAR POSITION SENSOR

(75) Inventor: Didier Puech, Toulouse (FR)

(73) Assignee: Siemens VDO Automotive, Toulouse Cedex (FR)

( * ) Notice: Subject to any disclaimer, the term of this patent is extended or adjusted under 35 U.S.C. 154(b) by 0 days.

(21) Appl. No.: 10/841,464

(22) Filed: May 10, 2004

(65) Prior Publication Data

US 2004/0222786 A1 Nov. 11, 2004

(30) Foreign Application Priority Data

May 9, 2003 (FR) .............................................. 03 05608

(51) Int. Cl.[7] ................................................. G01B 7/30
(52) U.S. Cl. ............................. 324/207.25; 324/207.2; 324/251
(58) Field of Search ..................... 324/207.2, 207.21, 324/207.22, 207.23, 207.25, 235, 251; 338/32 R, 32 H

(56) References Cited

U.S. PATENT DOCUMENTS 5,126,663 A    6/1992  Shinjo
6,693,421 B2 *  2/2004  Wolf ........................ 324/207.2
2003/0137291 A1 *  7/2003  Wendel et al. ........... 324/207.2

FOREIGN PATENT DOCUMENTS

DE    1 268 399     4/1968
FR    2 444 274     7/1980
FR    2 829 574     3/2003

* cited by examiner

*Primary Examiner*—Bot LeDynh
(74) *Attorney, Agent, or Firm*—Young & Thompson

(57) ABSTRACT

Angular position sensor including:
- a ferromagnetic ring (3) having an axis (8);
- a magnetic source (1) disposed substantially centrally with respect to the ring (3) and generating a magnetic field following a magnetic direction (6) that is generally perpendicular to the axis (8) of the ring (3);
- a Hall-effect cell (2) disposed inside the ring (3) on a radius (7) passing through the center of the ring and perpendicular to the magnetic direction (6) and to the axis (8) of the ring (3), the Hall-effect cell (2) measuring the radial magnetic field;
- a magnetic flux guide (4) interposed between the magnetic source (1) and the Hall-effect cell (2), the magnetic flux guide being rotatable around the magnetic source following the axis (8) of the ring (3).

5 Claims, 1 Drawing Sheet

CONTACTLESS HALL-EFFECT ANGULAR POSITION SENSOR

FIELD OF THE INVENTION

The invention relates to a contactless angular position sensor.

SUMMARY OF THE INVENTION

The object of the invention is to propose an angular position sensor that is accurate, robust and relatively inexpensive to implement.

According to the invention, the angular position sensor comprises:

- a ferromagnetic ring having an axis;
- a magnetic source disposed substantially at the centre of the ring and generating a magnetic field following a magnetic direction that is generally perpendicular to the axis of the ring;
- a Hall-effect cell disposed inside the ring on a radius passing through the center of the ring and perpendicular to the magnetic direction and to the axis of the ring, said Hall-effect cell measuring the radial magnetic field;
- a magnetic flux guide made of ferromagnetic material interposed between the magnetic source and the Hall-effect cell, said magnetic flux guide being rotatable about the magnetic source along the axis of the ring.

The absence of any contact between the elements makes this angular position sensor very robust. It exhibits a good linearity between the variations in voltage generated by the Hall-effect cell and the angular displacements of the magnetic flux guide relative to the magnetic source, to the Hall-effect cell and to the ring.

According to the invention, in order to improve the linearity, the magnetic flux guide has the form of an angular sector of a tube.

Advantageously, the angular sector is in the range from 120 to 150 degrees. Reducing the angular sector below 120 degrees results in a reduction in the range of linearity of the angular position sensor, whereas increasing the sector beyond 150 degrees does riot allow any further increase in the range of linearity of the angular position sensor which can barely exceed 120 degrees.

According to another feature according to the invention, the magnetic source is a parallelepipedal permanent magnet. The deviation from linearity can thus be kept to a few tenths of a percent over more than 100 degrees.

As a variant, the magnetic source is a cylindrical permanent magnet of circular cross section aligned coaxially with respect to the ring. The intrinsic deviation from linearity is greater than that of the aforementioned embodiment, however it can be very significantly improved by applying a sinusoidal correction.

BRIEF DESCRIPTION OF THE DRAWING

The invention will be even further elucidated by the following description that makes reference to the appended drawings in which.

DESCRIPTION OF THE PREFERRED EMBODIMENTS

Figure 1:
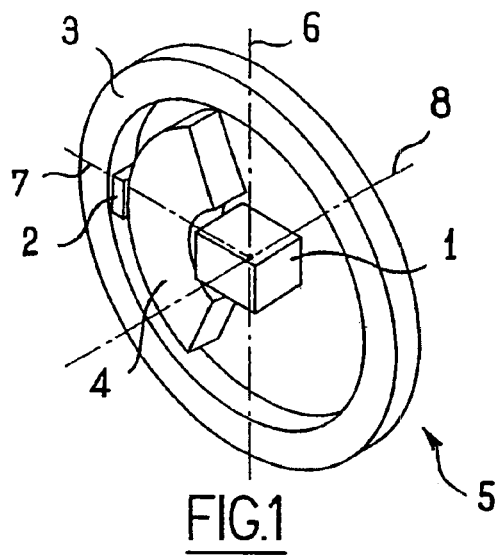
FIG. 1 is a drawing of an angular position sensor according to the invention shown in perspective.

As illustrated, the angular position sensor 5 comprises four elements: a magnetic source 1, a Hall-effect cell 2, a ring 3 and an angular sector 4 forming a magnetic flux guide.

The ring 3 and the sector must be ferromagnetic with a high permeability to facilitate magnetic flux guiding. Advantageously, they can be made of pure iron to reduce the hysteresis effect.

The ring 3 is circular and has an axis 8. Its cross section is basically-rectangular.

The magnetic source 1 shown in FIG. 1 consists of a permanent magnet located in the center of the ring 3. Its magnetization direction 6 is aligned with a diameter of the ring. The magnet 1 and the ring 3 are fixed relative to each other.

The Hall-effect cell 2 is disposed along a radius 7 of the ring which is aligned perpendicularly to the magnetic direction 6. It detects the radial magnetic field close to the ring 3 and is fixed relative to the latter. The output voltage from the cell 2 is proportional to the magnetic flux crossing it.

The sector 4 is placed between the magnet 1 and the cell 2. It extends over an angle of around 140 degrees and is rotatable with respect to the other elements about the axis of the ring 3. It extends radially between two cylindrical radial surfaces such that it has the form of a portion of a tube.

The sector 4 guides the flux from the magnet 1 toward the ring 3. The amount of this flux that it captures depends on its position.

Figure 2:
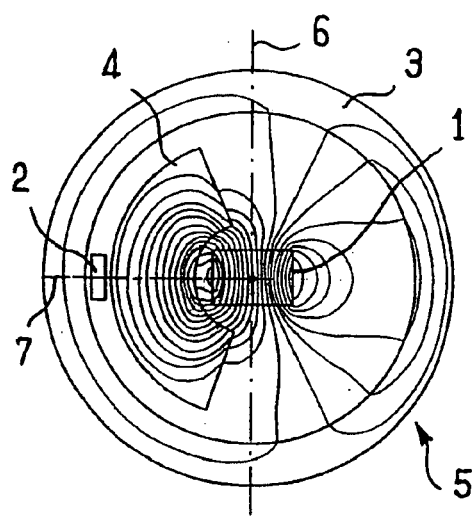
FIGS. 2, 3 and 4 show the magnetic field lines in the angular position sensor for three different angular positions.

Accordingly, FIG. 2 corresponds to the median position of the sector 4: its center is situated on the radius 7. In this position, the sector creates a magnetic short-circuit between the two poles of the magnet: there is very little flux passing within the ring and the magnetic field seen by the cell 2 is zero.

Figure 3:
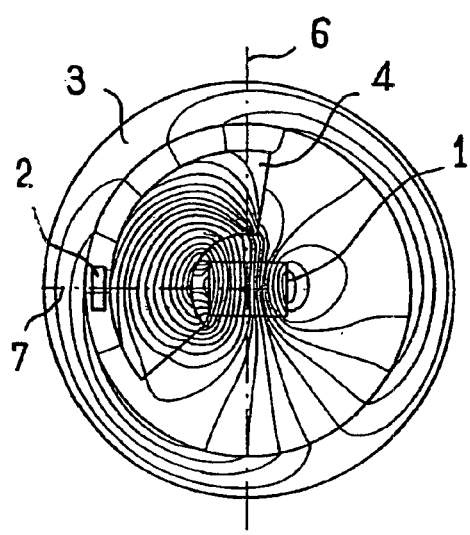

FIG. 3 corresponds to an intermediate position in which the sector has rotated by 30 degrees: the sector 4 captures part of the flux generated by the magnet 1 and directs it toward the ring 3 in a uniform manner: the cell 2 sees a medium magnetic field.

Figure 4:
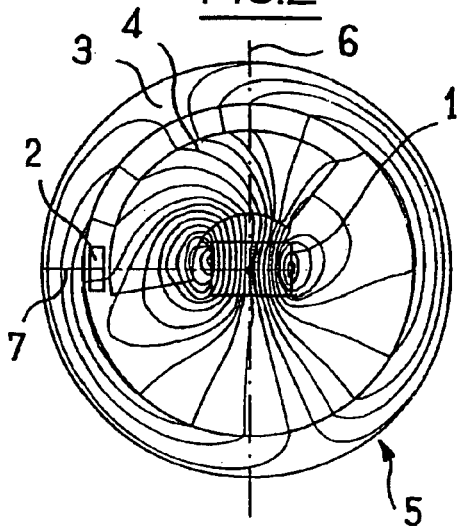

As the sector 4 continues to rotate, the field sampled by the cell 2 continues to increase linearly, the sector in covering indeed more and more of one of the magnet poles and thus capturing increasingly more flux. In the position illustrated in FIG. 4, the sector covers virtually the whole of the pole such that the flux sampled by the cell 2 is maximum. The sector 4 has rotated by 70 degrees.

Since the flux is uniform between the sector and the ring, the positioning of the cell 2 does not have to be very precise.

Figure 5:
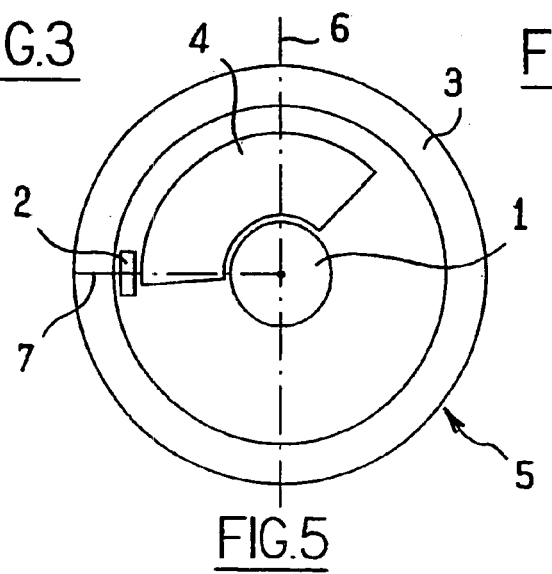
FIG. 5 shows a variant embodiment drawn in a radial plane.

The embodiment shown in FIG. 5 differs from that in FIG. 1 in that the magnetic source consists of a cylindrical magnet 1 in the form of a disk aligned coaxially with the center of the ring 3. It is magnetized along the same magnetic direction 6. The variation in the signal generated by the cell 2 is now sinusoidal. After processing to eliminate the sinusoidal component, a signal linearity as good as with the embodiment illustrated in FIG. 1 can be achieved with a similar rotational amplitude.

The invention is not, of course, in any way limited to the embodiment which is described above by way of a non-limiting example. Accordingly, an electrically magnetized coil could be employed in place of the permanent magnets as a magnetic source.

What is claimed is:

1. An angular position sensor (5) comprising:
   a ferromagnetic ring (3) having an axis (8);
   a magnetic source (1) disposed substantially at the center of the ring (3) and generating a magnetic field following a magnetic direction (6) that is generally perpendicular to the axis (8) of the ring (3);
   a Hall-effect cell (2) disposed inside the ring (3) on a radius (7) passing through the center of the ring and perpendicular to the magnetic direction (6) and to the axis (8) of the ring (3), said Hall-effect cell (2) measuring the radial magnetic field;
   a magnetic flux guide (4) interposed between the magnetic source (1) and the Hall-effect cell (2), said magnetic flux guide being rotatable about the magnetic source following the axis (8) of the ring (3).

2. The angular position sensor as claimed in claim 1, wherein the magnetic flux guide (4) has the form of an angular sector of a tube.

3. The angular position sensor as claimed in claim 2, wherein the angular sector is in the range from 120 to 150 degrees.

4. The angular position sensor as claimed in claim 1, wherein the magnetic source (1) is a permanent magnet in the form of a parallelepiped.

5. The angular position sensor as claimed in claim 1, wherein the magnetic source (1) is a cylindrical permanent magnet of circular cross section aligned coaxially with respect to the ring (3).

* * * * *